United States Patent
Samuel et al.

(10) Patent No.: US 10,338,933 B2
(45) Date of Patent: Jul. 2, 2019

(54) METHOD FOR GENERATING CUSTOM BIOS SETUP INTERFACE AND SYSTEM THEREFOR

(71) Applicant: Dell Products, LP, Round Rock, TX (US)

(72) Inventors: Balasingh P. Samuel, Round Rock, TX (US); Ricardo L. Martinez, Leander, TX (US); Richard M. Tonry, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 207 days.

(21) Appl. No.: 14/225,170

(22) Filed: Mar. 25, 2014

(65) Prior Publication Data

US 2015/0277895 A1  Oct. 1, 2015

(51) Int. Cl.
*G06F 9/44* (2018.01)
*G06F 9/4401* (2018.01)
*G06F 9/445* (2018.01)

(52) U.S. Cl.
CPC ........ *G06F 9/4411* (2013.01); *G06F 9/44505* (2013.01)

(58) Field of Classification Search
CPC .... G06F 9/4401; G06F 9/4408; G06F 9/4411; G06F 8/65; G06F 8/67
See application file for complete search history.

(56) References Cited

U.S. PATENT DOCUMENTS

| | | | |
|---|---|---|---|
| 6,658,562 B1 * | 12/2003 | Bonomo | G06F 21/572 713/1 |
| 7,380,174 B2 | 5/2008 | Mayo et al. | |
| 7,418,589 B2 * | 8/2008 | Chen | G06F 8/65 713/1 |
| 9,021,244 B2 * | 4/2015 | Bobzin | G06F 21/575 713/1 |
| 2003/0204714 A1 * | 10/2003 | Rothman | G06F 9/4411 713/100 |
| 2005/0177710 A1 * | 8/2005 | Rothman | G06F 9/44505 713/2 |
| 2007/0240095 A1 | 10/2007 | Shih et al. | |
| 2009/0019390 A1 * | 1/2009 | Su | G06F 9/4443 715/810 |
| 2010/0268622 A1 | 10/2010 | Kikinis et al. | |
| 2010/0318779 A1 | 12/2010 | Jones et al. | |
| 2012/0017073 A1 * | 1/2012 | Gillespie | G06F 9/44505 713/2 |
| 2012/0272049 A1 * | 10/2012 | Chang | G06F 3/0488 713/2 |

\* cited by examiner

*Primary Examiner* — Zahid Choudhury
(74) *Attorney, Agent, or Firm* — Larson Newman, LLP

(57) ABSTRACT

Configuration options to be displayed at a basic input/output system (BIOS) setup interface of an information handling system are specified using a software application executed at the system. The configuration options are communicated to a software agent, and the software agent updates BIOS firmware based on the configuration option.

19 Claims, 5 Drawing Sheets

METHOD FOR GENERATING CUSTOM BIOS SETUP INTERFACE AND SYSTEM THEREFOR

FIELD OF THE DISCLOSURE

This disclosure generally relates to information handling systems, and more particularly relates to generating custom BIOS setup interfaces at an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Information handling systems are increasingly relied upon for personal and business activities.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
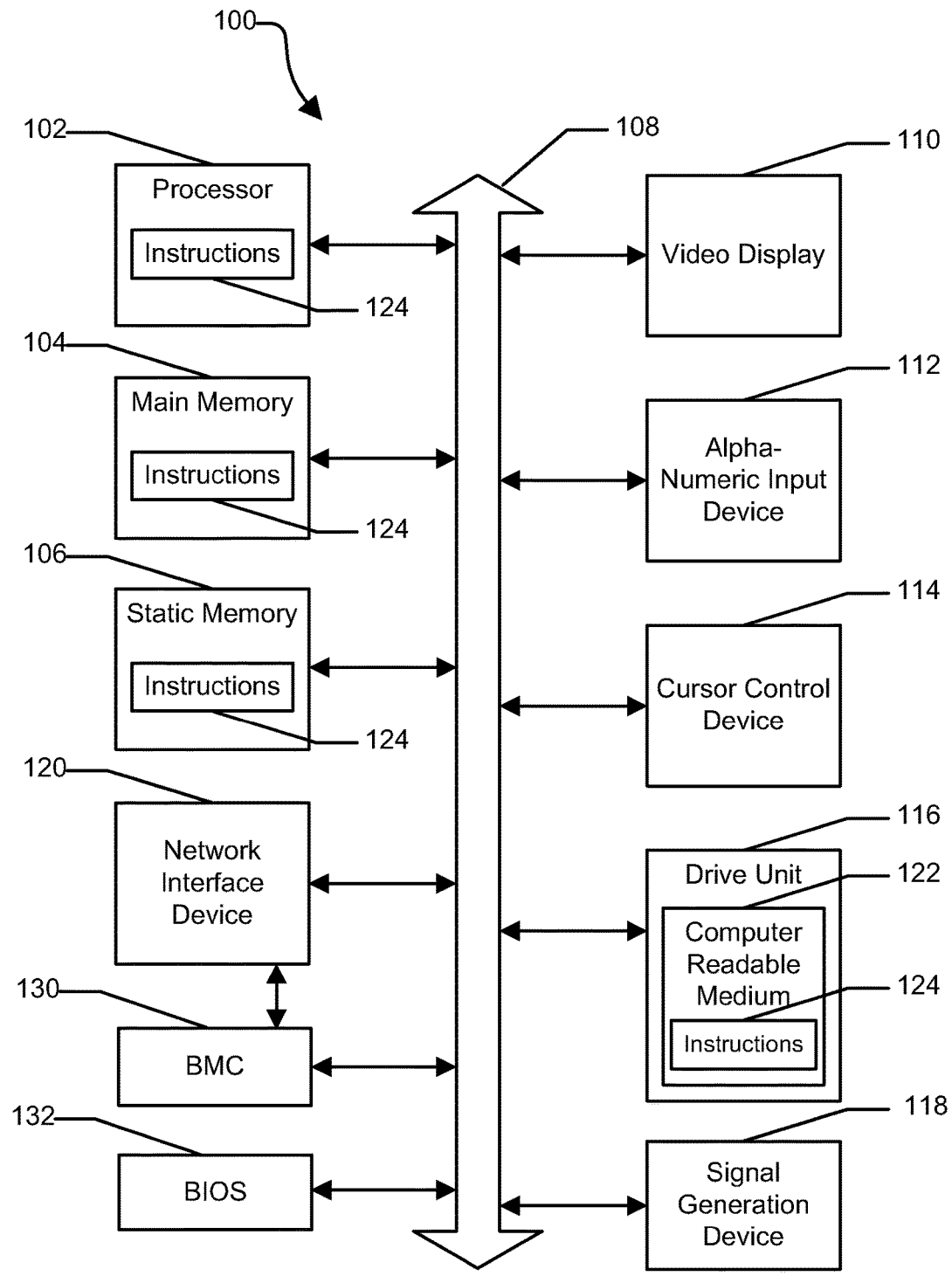
FIG. 1 is a block diagram illustrating an information handling system including a Basic Input/Output System (BIOS) in accordance with a specific embodiment of the present disclosure.

FIG. 1 shows an information handling system 100 including a BIOS 132. In accordance with specific embodiments of the present disclosure, a user of system 100 can utilize a software application to specify and configure system options to be displayed at a setup browser of the BIOS 132. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The information handling system may also include additional buses operable to transmit information between the various hardware components, and may include additional storage devices, such as non volatile memory devices. The information handling system 100 can include a service processor, such as the Baseband Management Controller 130 to enable remote monitoring and management of aspects of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

When power is first applied to information handling system 100, the system begins a sequence of initialization procedures during which components of the system are configured and enabled for operation. During the initialization sequence, also referred to as a boot sequence, device drivers associated with devices included at the system 100 can be installed. Device drivers provide an interface through which other components of the system 100 can communicate with a corresponding device. Components included at the system 100 can include multiple operating modes or options that are configurable. In addition, various system functions can be customized. For example, the BIOS 132 can be configured to search for a bootable operating system on a particular hard drive or optical drive. Some or all of these configurable properties can be presented to a user of the information handling system 100 at a graphical user interface, such as a BIOS setup screen. The BIOS setup screen is typically accessed by actuating a predetermined key at a keyboard during the boot process. Once accessed, the BIOS setup screen provides an interface through which a user can alter operation or configuration of devices included at the system 100. As disclosed herein, the BIOS setup screen can be customized to include all, or a desired subset of all of the configurable components of the system. For example, an enterprise may elect to limit the number of options available to end-users of a personal computer, or to customize the BIOS setup menus to support specific needs of an application at the enterprise.

In an embodiment, the BIOS 132 at the information handling system 100 is substantially compliant with one or more revisions of the UEFI specification. The UEFI standard replaces the antiquated BIOS found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware and a configuration setup interface.

Figure 2:
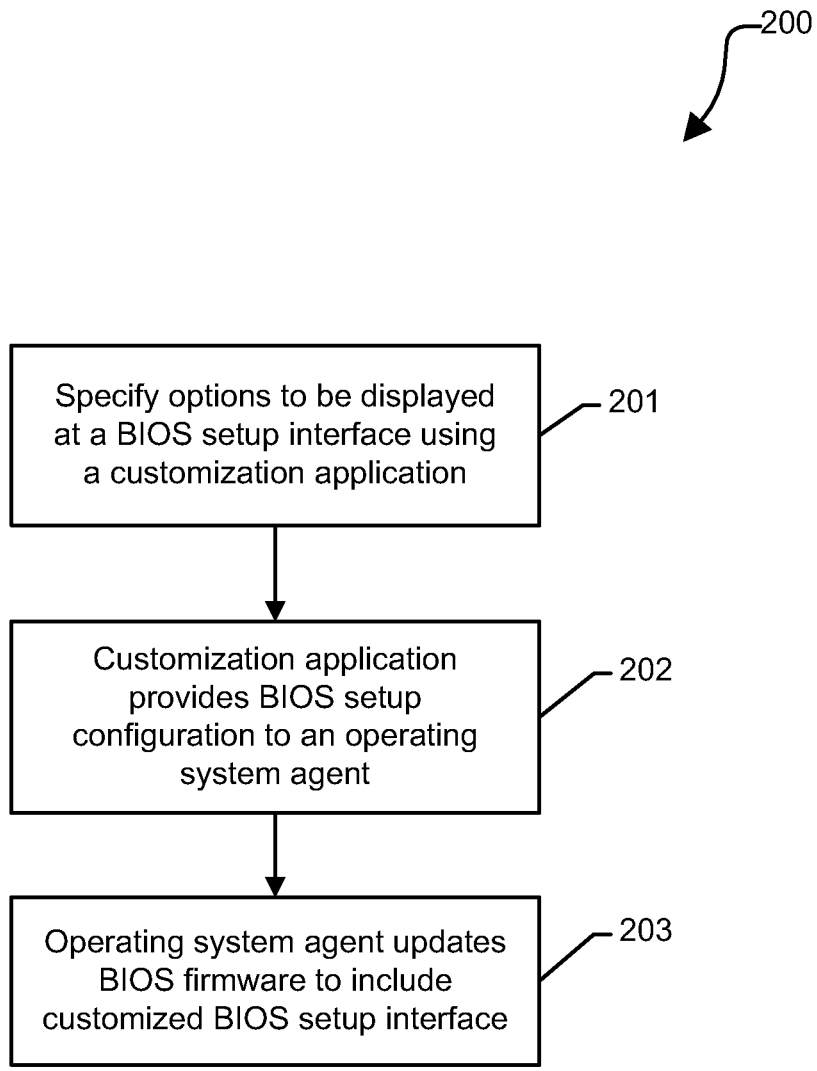
FIG. 2 is a flow diagram illustrating a method for updating a BIOS setup interface at the information handling system of FIG. 1 according to a specific embodiment of the present disclosure.

FIG. 2 shows a method 200 for updating a BIOS setup interface at the information handling system 100 according to a specific embodiment of the present disclosure. The method begins at block 201 where a user employs a customization application to specify options to be displayed at a BIOS setup interface. For example, the customization application can include a software program that is installed at information handling system 100. The application is available to a user of information handling system 100 after the system has completed a boot process and an operating system has been loaded. In one embodiment, the customization application can provide a visual editor with which a user can specify configuration options that will be presented at a BIOS setup screen. For example, the customization application can include a menu of objects that can be instantiated at a user interface of the application, each object representing a configurable device or configuration option available at the system 100. After a user has completed specifying features to be included at the BIOS setup screen, the customization application can generate a data file, referred to herein as a data blob. The data blob includes a collection of configuration features that the user desires to be included at the BIOS setup screen. The information handling system 100 may initially be configured to display generic BIOS setup options. For example, a generic or default BIOS setup screen can provide an interface to facilitate configuration of all configurable devices and options available at the system 100.

The method 200 continues at block 202 where the customization application provides a data blob containing the user's selection of configuration objects to an operating system agent. The operating system agent can include a handler associated with a System Management Mode (SMM), a UEFI Runtime Process, an Advanced Configuration and Power Interface (ACPI), or the like. For example, an SMM handler can be notified of an SMM event by the operating system and initiate a context switch to an SMM process. The method proceeds to block 203 where the operating system agent updates the BIOS firmware to include the BIOS setup interface specified by the user of the customization application. For example, the SMM process can be configured to receive a data blob prepared by the customization application, modify the BIOS setup screen and underlying configuration options as defined by the user, and store the revised setup configuration options at a nonvolatile memory containing the BIOS firmware. During a subsequent boot of information handling system 100, a user can prompt the system 100 to display the BIOS setup screen, which will now reflect the changes specified by the user of the customization application. As used herein, SMM refers to a special-purpose operating mode of information handling system 100 configured to provide system-wide functions like power management, system hardware control, execution of proprietary OEM-designed code, and the like. The SMM can be entered in response to a System Management Interrupt (SMI). Techniques disclosed herein can be better understood with reference to FIGS. 3-5, below.

Figure 3:
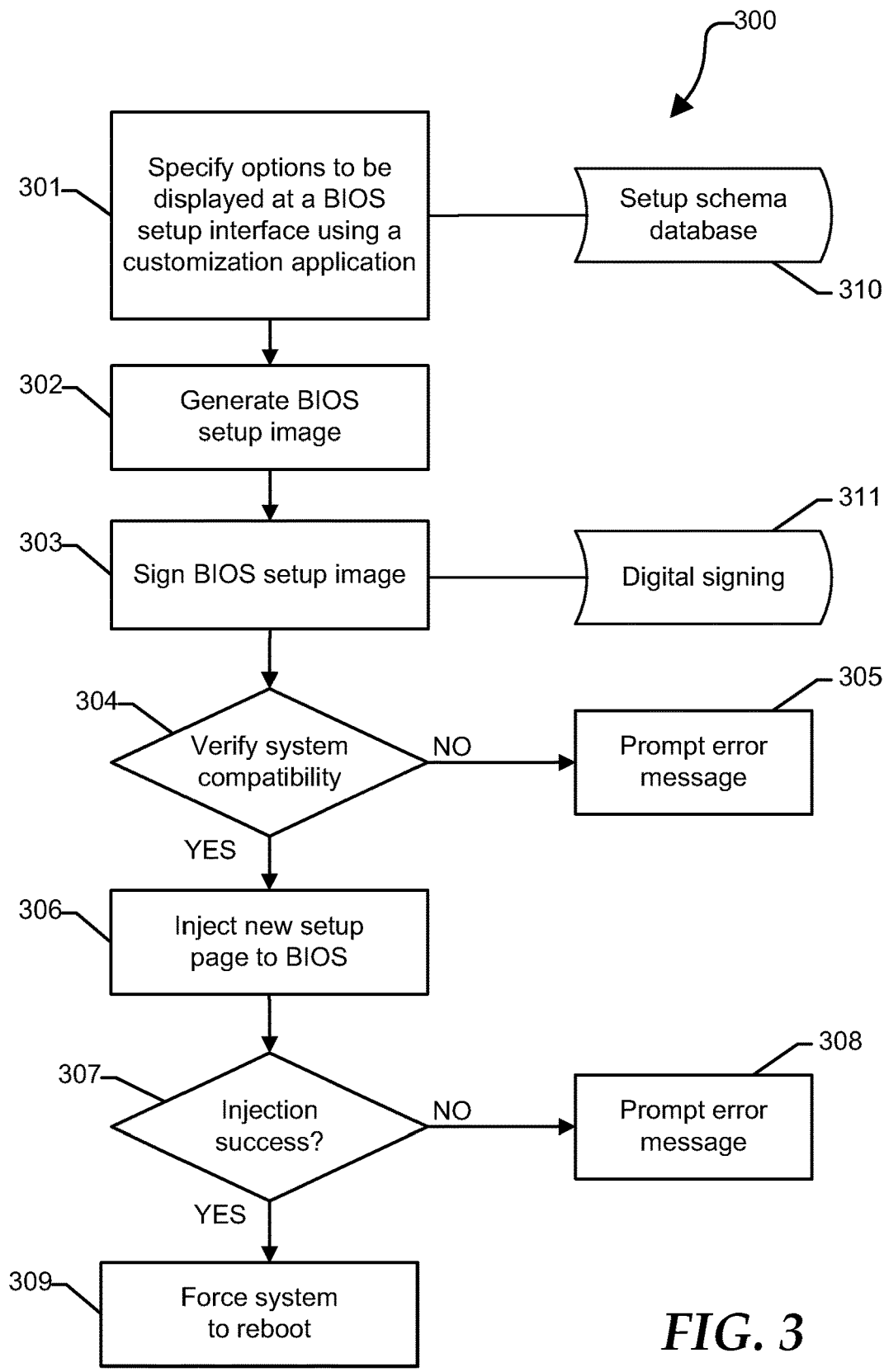
FIG. 3 is a flow diagram illustrating a method for updating a BIOS setup interface at the information handling system of FIG. 1 according to another embodiment of the present disclosure.

FIG. 3 shows a method 300 for updating a BIOS setup interface at the information handling system 100 according to another embodiment of the present disclosure. The method 300 begins at block 301 where a user specifies options to be displayed at a BIOS setup interface using a customization application. As described above with reference to FIG. 2, the customization application can provide a visual editor with which a user can specify configuration options that will be presented at a BIOS setup screen. Objects representing a configurable device or configuration option can be instantiated at a user interface of the application. In an embodiment, the objects can be retrieved from a setup schema database 310 maintained at a service provider. For example, the customization application can communicate with a remote service provider using one or more Internet protocols. Objects included at the setup schema database can include embedded program code, application programming interfaces (APIs), and the like. The method continues at block 302 where the software application generates a custom BIOS setup image based on the user's specification defined using the application. The setup image, or data blob, can include standardized and/or proprietary data structures to document or encode BIOS setup menu features selected by the user.

The method continues at block 303 where the custom setup image can be signed using standard or proprietary validation, authentication, and/or encryption technology. For example, a digital signing process 311 can be invoked to generate a signature for authenticating the setup image. In an embodiment, the information handling system 100, and the operating system agent in particular, can authenticate a setup image prior to installation at the system BIOS 132. For example, the operating system agent can utilize a private key to decrypt the signed data blob. In an embodiment, a remote service provider can perform the digital signing. The method continues at decision block 304 where the operating system agent can verify that the custom setup image is compatible with the information handling system 100. If the agent verifies that the setup image is compatible with the system 100, the method proceeds to block 306 where the new setup page is injected into BIOS 132. If the agent determines that the setup image is not compatible with the system 100, the method branches to block 305 where an error message can be displayed.

The method continues at decision block 307 where the operating system agent can determine whether the injection process was fully successful. If the injection is successful, the method proceeds to block 309 where a reboot of the information handling system 100 can be initiated. Alternatively, normal operation of system 100 can continue until a later time when the system is rebooted. If an error is encountered during the injection process, the BIOS is not updated, and the method branches to block 308 where an error message can be displayed. One of skill will appreciate that one or more features described above can be omitted without departing from the scope of the present disclosure.

Figure 4:
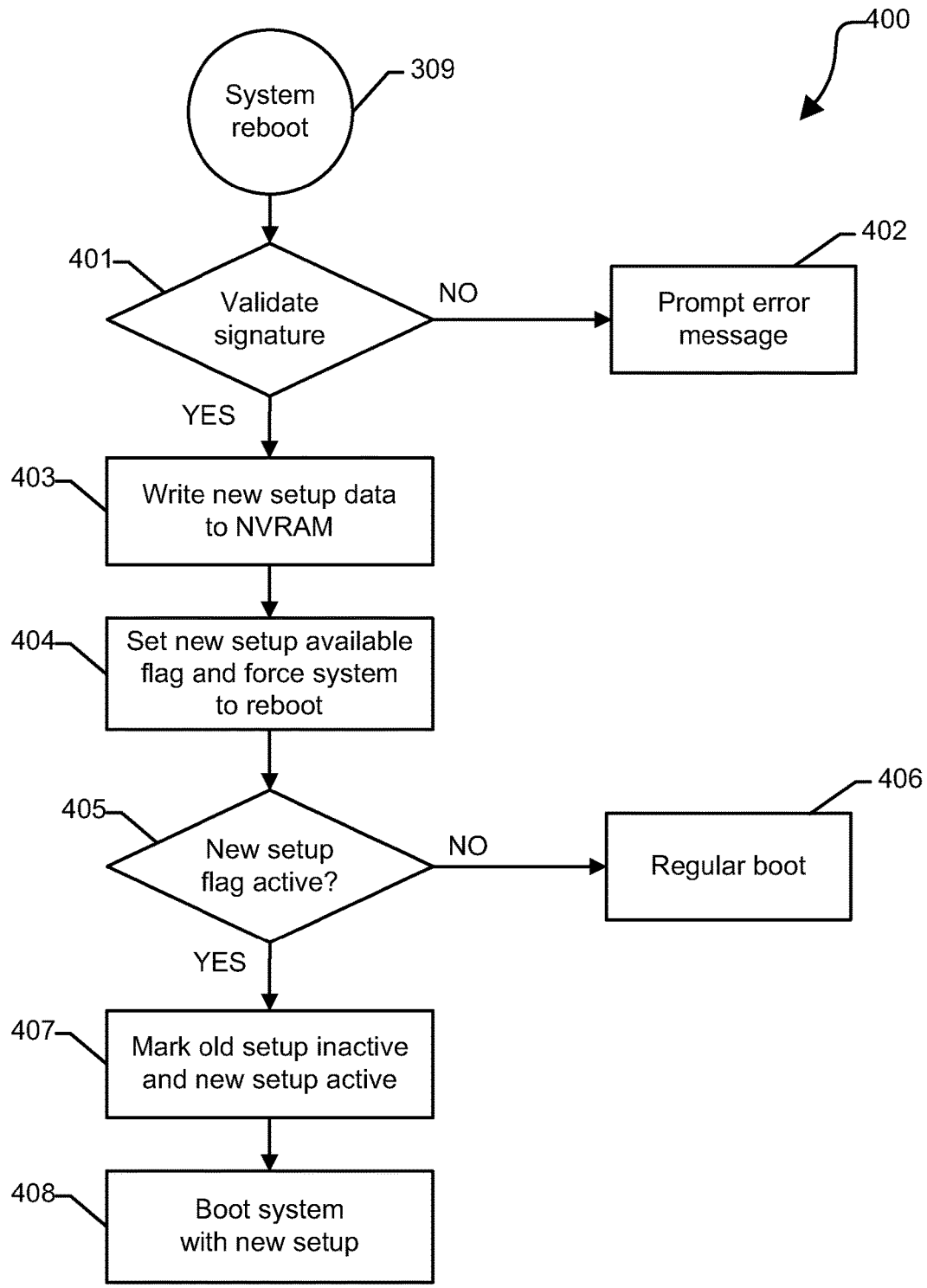
FIG. 4 is a flow diagram illustrating a method for updating a BIOS setup interface at the information handling system of FIG. 1 according to yet another embodiment of the present disclosure.

FIG. 4 shows a method 400 for updating a BIOS setup interface at the information handling system 100 according to yet another embodiment of the present disclosure. In particular, method 400 illustrates operations that can be performed during the reboot operation corresponding to block 309 at FIG. 3. The method 400 begins at decision block 401 where it is the custom setup image is validated based on the signature provided at block 303 of FIG. 3. If the setup image is determined to be invalid or authentication is otherwise unsuccessful, the method branches to block 402 where an error message is displayed or appended to an error log. If the setup image is valid, the method proceeds to block 403 where the new setup data can be stored at a non-volatile random access memory (NVRAM) included at BIOS 132. The method continues at block 404 where a flag indicating that new setup data is available is asserted, and the reboot of the system 100 is initiated. For example, a New Setup Available flag can be included at a UEFI BIOS register, and during initial stages of the boot sequence, the register can be accessed to determine whether a new BIOS setup screen is available.

The method 400 continues at decision block 405 where BIOS code determines whether the New Setup Available flag is set. If the flag is not set, the method branches to block 406 where standard boot code including a default BIOS setup screen is executed. However, if the New Setup Available flag is set, the flow proceeds from decision block 405 to block 407 where the old setup information is marked old, and the new setup data is marked active. The method proceeds to block 408 where the system continues the boot process, incorporating the new BIOS screen generated by the custom setup application. A user can interrupt the boot sequence to access the BIOS setup screen in the typical manner described above, and the user will be presented with the custom setup screen including only options specifically identified during the customization process. After the user negotiates the custom BIOS screen, configuring available devices as desired, the setup configuration can be saved and the boot sequence can continue. The final step of the boot sequence typically includes loading of an operating system.

Figure 5:
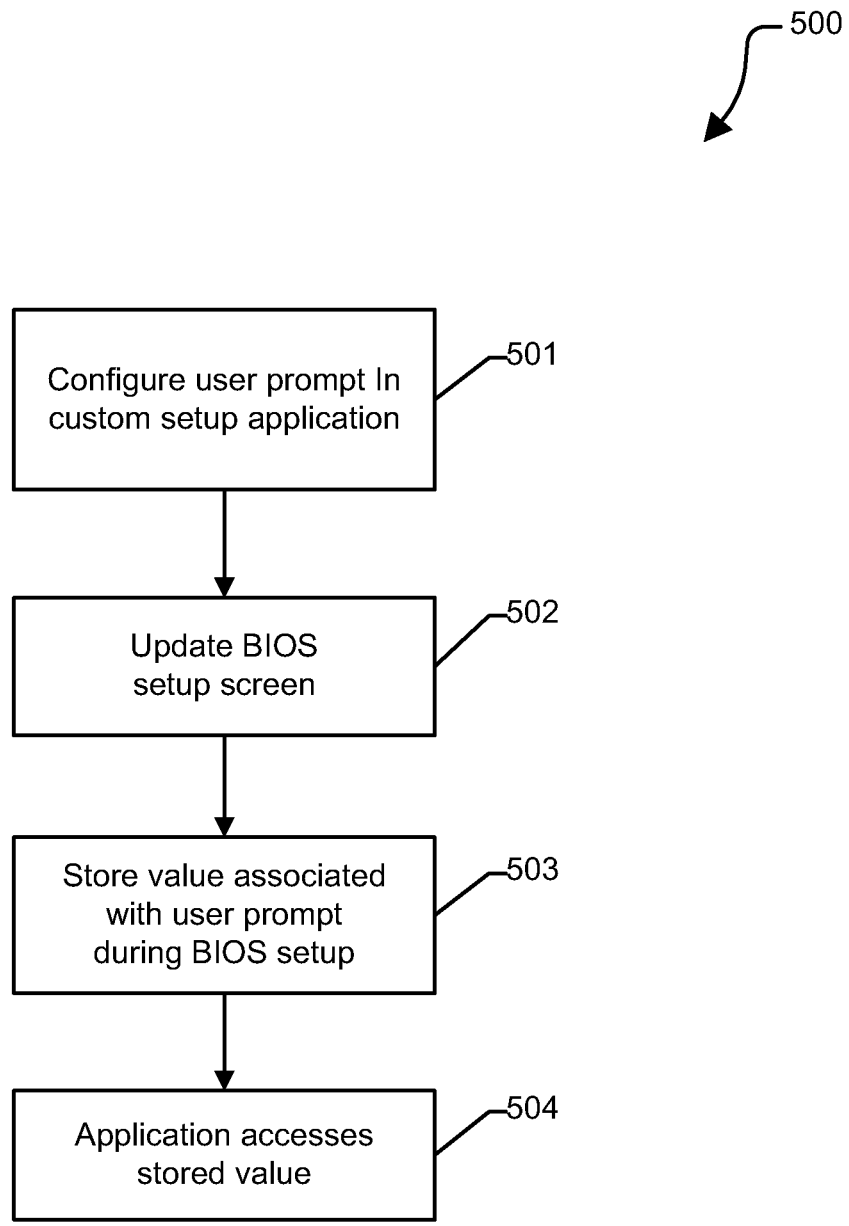
FIG. 5 is a flow diagram illustrating a method for providing a custom prompt for information at a BIOS setup interface of the information handling system 100.

FIG. 5 shows a method 500 for providing a custom prompt for information at a BIOS setup interface of the information handling system 100. In particular, a prompt for information can be displayed at the BIOS setup screen. A user can provide information at the prompt and the information can be made accessible to the BIOS or to an application program executing at the system 100. The method 500 begins at block 501 where a user prompt is configured using a customization application. For example, an object representing a user prompt can be instantiated at a user interface of the customization application described above, the object configured to generate program code to display a prompt for information at the BIOS setup screen, and to receive the information provided by a user in response to the prompt. One example, the prompt may solicit a name of the user, a job code, authorization information, and the like. The method continues at block 502 where the BIOS setup screen at the information handling system 100 is updated by the operating system agent to include the user prompt and other interface options specified using the customization program. The method continues at block 503 where the custom BIOS setup screen can be displayed during a subsequent boot sequence, the setup screen including the prompt for user information. A user can enter information at the prompt and the information can be stored at a memory location. For example, the information can be stored at a NVRAM associated with the BIOS, at a memory device, at a hard drive, or the like. The method continues at block 504 where an application can access the stored information provided by the user at the BIOS setup screen prompt. For example, a software program executing under control of the operating system can retrieve the stored information and configure operation of the information handling system 100 based on the stored information.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124, such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal; so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer implemented method comprising:
   actuating a predetermined key during boot initialization of an information handling system to display a basic input/output system (BIOS) setup interface;
   determining that a first configuration option is not available at the BIOS setup interface;
   exiting the BIOS setup interface to allow the information handling system to complete the boot initialization and to load an operating system;
   invoking, by a user of the information handling system, a runtime application, the runtime application identifying a plurality of configuration options, including the first configuration option; and
   selecting, by the user at an interface of the runtime application, the first configuration option from the plurality of configuration options, the selecting causing a software agent to update BIOS firmware to include the first configuration option at the BIOS setup interface.

2. The method of claim 1, further comprising displaying the first configuration option at the BIOS setup interface in response to actuating the predetermined key during a boot initialization of the information handling system following the selecting.

3. The method of claim 1, wherein the software agent comprises a system management mode process.

4. The method of claim 1, wherein the software agent comprises a Unified Extensible Firmware Interface (UEFI) runtime service.

5. The method of claim 1, wherein the first configuration option comprises a prompt soliciting an alpha-numeric string from a user of the information handling system, the prompt to be presented at the BIOS setup interface.

6. The method of claim 5, further comprising:
   storing at a non-volatile memory the alpha-numeric string provided by a user of the information handling system in response to presentation of the prompt.

7. The method of claim 1, wherein selecting the first configuration option comprises:
   identifying a first object representing a configurable component of an information handling system, the object instantiated at a user interface of a software application.

8. The method of claim 1, further comprising:
   encapsulating the first configuration option to provide a data blob; and
   associating a digital signature with the data blob, the signature to facilitate authentication of the data blob.

9. An information handling system comprising:
   a memory; and
   computer-readable instructions stored at the memory and executable by a microprocessor to:
      display a basic input/output system (BIOS) setup interface to allow a user to determine that a first configuration option is not available at the BIOS setup interface;
      exit the BIOS setup interface to allow the information handling system to complete the boot initialization and to load an operating system;
      determine at a runtime application the first configuration option to be displayed and available for selection at the basic input/output system (BIOS) setup interface of the information handling system, the BIOS setup interface to be displayed in response to the actuating of a predetermined key during initialization of the information handling system; and communicate the first configuration option to a software agent, the software agent to update BIOS firmware to include the first configuration option at the BIOS setup interface.

10. The system of claim 9, wherein the instructions are further to:

determine the first configuration option based on information entered by the user at the runtime application, the runtime application executing under control of an operating system.

11. The system of claim 9, wherein the instructions are further to:

display the BIOS setup interface at the information handling system in response a request by the user, the request received during a boot sequence at the information handling system.

12. The system of claim 9, wherein the software agent comprises a system management mode process.

13. The system of claim 9, wherein the software agent comprises a Unified Extensible Firmware Interface (UEFI) runtime service.

14. The system of claim 9, wherein the first configuration option comprises a prompt for the user to provide user authorization information, the prompt to be presented at the BIOS setup interface.

15. The system of claim 14, wherein the instructions are further to:

store at a non-volatile memory the user authorization information provided by the user of the information handling system in response to presentation of the prompt.

16. The system of claim 9, wherein determining the first configuration option comprises:

identifying a first object representing a configurable component of an information handling system, the object instantiated at a user interface of a software application.

17. A non-transitory computer readable medium embodying a software program, the software program comprising instructions executable by a processor to:

display a plurality of configuration options at a basic input/output system (BIOS) setup interface of an information handling system in response to an actuating of a predetermined key during initialization of the information handling system, the plurality of configuration options not including a first configuration option;

transfer control of the information handling system to an operating system;

execute a runtime application, the runtime application to display a plurality of configuration options including the first configuration option;

receive, at the runtime application, a selection by a user, the selection specifying the first configuration option;

communicate the first configuration option to a software agent, the software agent to update BIOS firmware to include the first configuration option; and display the first configuration option at the BIOS setup interface in response to actuating the predetermined key during a boot initialization of the information handling system following the communicating.

18. The non-transitory computer-readable medium of claim 17, further comprising instructions to:

retrieve the plurality of configuration options from a setup schema database maintained at a remote service provider.

19. The non-transitory computer-readable medium of claim 17, wherein the software agent comprises a system management mode process.

* * * * *